United States Patent
Zeng (10) Patent No.: US 9,959,601 B2
(45) Date of Patent: May 1, 2018

(54) DISTORTION RECTIFICATION METHOD AND TERMINAL

(71) Applicant: Guangdong Oppo Mobile Telecommunications Corp., Ltd., Dongguan (CN)

(72) Inventor: Yuanqing Zeng, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days. days.

(21) Appl. No.: 15/713,755

(22) Filed: Sep. 25, 2017

(65) Prior Publication Data
US 2018/0012341 A1 Jan. 11, 2018

Related U.S. Application Data

(63) Continuation of application No. 15/538,024, filed as application No. PCT/CN2016/083690 on May 27, 2016.

(30) Foreign Application Priority Data

Jun. 30, 2015 (CN) .......................... 2015 1 0383298

(51) Int. Cl.
*G06K 9/00* (2006.01)
*G06T 5/00* (2006.01)
(Continued)

(52) U.S. Cl.
CPC ............ *G06T 5/003* (2013.01); *G06T 3/0018* (2013.01); *G06T 3/0087* (2013.01); *G06T 7/11* (2017.01);
(Continued)

(58) Field of Classification Search
CPC ..... G06T 5/006; G06T 3/0018; G06T 3/0062; G06T 7/60; G06T 3/0006; G06K 9/52
See application file for complete search history.

(56) References Cited

U.S. PATENT DOCUMENTS

| | | | |
|---|---|---|---|
| 2005/0122400 A1* | 6/2005 | Kochi | H04N 5/217 348/207.99 |
| 2008/0055616 A1 | 3/2008 | Scott et al. | |

(Continued)

FOREIGN PATENT DOCUMENTS

| | | |
|---|---|---|
| CN | 101305595 A | 11/2008 |
| CN | 101513035 A | 8/2009 |

(Continued)

OTHER PUBLICATIONS

Kopf et al "Locally Adapted Projections to Reduce Panorama Distortions," Eurographics Symposium on Rendering vol. 28, No. 4, 2009 (7 pages).

*Primary Examiner* — Li Liu
(74) *Attorney, Agent, or Firm* — JMB Davis Ben-David (57) ABSTRACT

Disclosed is a distortion rectification method, comprising: taking a wide-angle photograph using a camera of a terminal; determining distortion regions and non-distortion regions in the wide-angle photograph; obtaining a target distortion region selected by a user; dividing the target distortion region into M grid regions of a first pre-set size, wherein M is an integer greater than or equal to one; and respectively preforming distortion rectification on the M-grid regions of the first pre-set size. Also disclosed is a terminal.

8 Claims, 8 Drawing Sheets

(51) Int. Cl.
  *G06T 3/00*   (2006.01)
  *G06T 7/11*   (2017.01)
  *H04N 5/232*  (2006.01)

(52) U.S. Cl.
  CPC .... *G06T 2207/20021* (2013.01); *H04N 5/232* (2013.01)

(56) References Cited

U.S. PATENT DOCUMENTS

| | | | | |
|---|---|---|---|---|
| 2008/0101713 A1* | 5/2008 | Edgar | ................... | G06T 3/0018 382/260 |
| 2009/0041378 A1 | 2/2009 | Yamaoka et al. | | |
| 2009/0141148 A1 | 6/2009 | Imamura et al. | | |
| 2010/0111440 A1 | 5/2010 | Chai et al. | | |
| 2011/0254957 A1* | 10/2011 | Eder | ......................... | B60R 1/00 348/148 |
| 2012/0086807 A1* | 4/2012 | Simon | .................. | G06T 3/0062 348/148 |
| 2012/0114262 A1* | 5/2012 | Yu | .......................... | G06T 5/006 382/254 |
| 2014/0247358 A1* | 9/2014 | Takeda | .................... | G06T 5/006 348/148 |
| 2015/0049220 A1* | 2/2015 | Kuwata | .............. | H04N 5/23296 348/240.99 |
| 2015/0298822 A1* | 10/2015 | Eline | .................. | B64C 39/024 244/75.1 |
| 2016/0119551 A1* | 4/2016 | Brown | .................. | G06T 3/0062 345/646 |
| 2017/0041538 A1* | 2/2017 | Choi | ..................... | G06T 3/0062 |
| 2017/0094278 A1* | 3/2017 | Bickerstaff | .......... | H04N 19/136 |
| 2017/0308991 A1* | 10/2017 | Yamamoto | ............ | G06T 3/0087 |

FOREIGN PATENT DOCUMENTS

| | | |
|---|---|---|
| CN | 101572828 A | 11/2009 |
| CN | 102885631 A | 1/2013 |
| CN | 103247031 A | 8/2013 |
| CN | 105141827 A | 12/2015 |
| JP | 2001223891 A | 8/2001 |

\* cited by examiner

DISTORTION RECTIFICATION METHOD AND TERMINAL

CROSS REFERENCE TO RELATED APPLICATION

This is a Continuation of co-pending U.S. patent application Ser. No. 15/538,024 filed on Jun. 20, 2017, which is the U.S. National Stage of International Application No. PCT/CN2016/083690, filed on May 27, 2016, which claims priority to Chinese Application No. 201510383298.3, filed on Jun. 30, 2015. The above patent applications are incorporated by referenced herein in their entirety.

BACKGROUND OF THE DISCLOSURE

1. Field of the Disclosure

The present disclosure relates to the field of electronic equipment, and particularly to a distortion rectification method and a terminal.

2. Description of the Related Art

Following the quick development of information technology, the functions of an integrated terminal can carry out more and more functions, such as photo shooting, web browsing, gaming, shopping, etc. However, the terminal is not omnipotent. In the present technology, the terminal can carry out the photo shooting; however, during the photo shooting, the shooting range is subjected to a certain limitation.

Generally, people think to use a wide-angle camera lens to take the picture. The photo taken by the wide-angle camera lens generates a distortion at a region beyond a certain angular range. Such distortion is generated due to the nature of the characteristic of the wide-angle camera lens itself. How to rectify the distortion of any of the distorted regions selected by the user has not been resolved.

SUMMARY

The present disclosure provides a method for rectifying distortion and a terminal, in order to correct the distorted regions of the photo taken by the camera lens, thereby to lessen the degree of the distortion.

In an embodiment of the present disclosure, a method for rectifying distortion includes:

taking a wide-angle picture by using a camera lens of a terminal;

identifying a distorted region and an undistorted region of the wide-angle picture;

obtaining a targeted distorted region selected by a user;

dividing the targeted distorted region into M-numbered grid areas each having a first predetermined size, wherein the M is an integer equal to or larger than 1;

rectifying the distortion of each of the M-numbered grid areas which has the first predetermined size;

wherein rectifying the distortion of each of the M-numbered grid areas which has the first predetermined size includes:

identifying a central grid area of the M-numbered grid areas each having the first predetermined size;

subjecting the central grid area to a first space transformation to obtain a targeted grid area having a second predetermined size;

subjecting each of the M-numbered grid areas other than the central grid area and having the first predetermined size to a second space transformation to obtain (M-1)-numbered targeted grid areas each having the second predetermined size;

subjecting each of the M-numbered targeted grid areas to an interpolation processing according to the change of the size of the M-numbered grid areas each having the first predetermined size, wherein the magnitude of the change of the size is the difference between the first predetermined size and the second predetermined size;

where identifying a distorted region and an undistorted region of the wide-angle picture includes:

identifying a region of the wide-angle picture which has a coefficient of distortion larger than a threshold value as a distorted region;

identifying a region of the wide-angle picture which has a coefficient of distortion equal to or smaller than the threshold value as an undistorted region.

In the method of rectifying the distortion in accordance with the present disclosure, after rectifying the distortion of each of the M-numbered grid areas which has the first predetermined size, it further includes:

mapping the image obtained after the distortion rectifications back to the wide-angle picture at a corresponding position.

In the method of rectifying the distortion in accordance with the present disclosure, obtaining a targeted distorted region selected by a user includes:

identifying a part of the targeted region located at the distorted region of the wide-angle picture as the targeted distorted region when the targeted region selected by the user includes a part of the undistorted region.

In the method of rectifying the distortion in accordance with the present disclosure, the first space transformation includes linear space transformation or nonlinear space transformation.

In the method of rectifying the distortion in accordance with the present disclosure, the interpolation processing includes linear interpolation, dual linear interpolation, quadratic interpolation or nonlinear interpolation.

The embodiment of the present disclosure also provides a method for rectifying distortion, which includes:

taking a wide-angle picture by using a camera lens of a terminal;

identifying a distorted region and an undistorted region of the wide-angle picture;

obtaining a targeted distorted region selected by a user;

dividing the targeted distorted region into M-numbered grid areas each having a first predetermined size, wherein the M is an integer equal to or larger than 1;

rectifying the distortion of each of the M-numbered grid areas which has the first predetermined size.

In the method of rectifying the distortion in accordance with the present disclosure, rectifying the distortion of each of the M-numbered grid areas which has the first predetermined size includes:

identifying a central grid area of the M-numbered grid areas each having the first predetermined size;

subjecting the central grid area to a first space transformation to obtain a targeted grid area having a second predetermined size;

subjecting each of the M-numbered grid areas other than the central grid area and having the first predetermined size to a second space transformation to obtain (M-1)-numbered targeted grid areas each having the second predetermined size;

subjecting each of the M-numbered targeted grid areas to an interpolation processing according to the change of the size of the M-numbered grid areas each having the first predetermined size, wherein the magnitude of the change of the size is the difference between the first predetermined size and the second predetermined size.

In the method of rectifying the distortion in accordance with the present disclosure, identifying a distorted region and an undistorted region of the wide-angle picture includes:

identifying a region of the wide-angle picture which has a coefficient of distortion larger than a threshold value as a distorted region;

identifying a region of the wide-angle picture which has a coefficient of distortion equal to or smaller than the threshold value as an undistorted region.

In the method of rectifying the distortion in accordance with the present disclosure, after rectifying the distortion of each of the M-numbered grid areas which has the first predetermined size, it further includes:

mapping the image obtained after the distortion rectifications back to the wide-angle picture at a corresponding position.

In the method of rectifying the distortion in accordance with the present disclosure, obtaining a targeted distorted region selected by a user includes:

identifying a part of the targeted region located at the distorted region of the wide-angle picture as the targeted distorted region when the targeted region selected by the user includes a part of the non-distorted region.

In the method of rectifying the distortion in accordance with the present disclosure, the first space transformation includes linear space transformation or nonlinear space transformation.

In the method of rectifying the distortion in accordance with the present disclosure, the interpolation processing includes linear interpolation, dual linear interpolation, quadratic interpolation or nonlinear interpolation.

The embodiment of the present disclosure also provides a terminal which includes:

a photo shooting unit which utilizes a camera lens of the terminal to take a wide-angle picture;

a first identifying unit for identifying a distorted region and an undistorted region of the wide-angle picture taken by the photo shooting unit;

an acquiring unit for obtaining a targeted distorted region selected by a user;

a dividing unit for dividing the targeted distorted region obtained by the acquiring unit into M-numbered grid areas each having a first predetermined size, wherein the M is an integer equal to or larger than 1.

a correction unit for rectifying the distortion of each of the M-numbered grid areas divided by the dividing unit and having the first predetermined size.

In the terminal of the present disclosure, the correction unit includes:

a second identifying unit for identifying a central grid area of the M-numbered grid areas divided by the dividing unit and each having the first predetermined size;

a first transformation unit for subjecting the central grid area identified by the second identifying unit to a space transformation to obtain a targeted grid area having a second predetermined size;

a second transformation unit for subjecting each of the M-numbered grid areas other than the central grid area and having the first predetermined size to a second space transformation to obtain (M-1)-numbered targeted grid areas each having the second predetermined size;

an interpolation unit for subjecting each of the M-numbered targeted grid areas to an interpolation processing according to the change of the size of the M-numbered grid areas each having the first predetermined size, wherein the magnitude of the change of the size is the difference between the first predetermined size and the second predetermined size.

In the terminal of the present disclosure, the first identifying unit includes:

a third identifying unit for identifying a region of the wide-angle picture which has a coefficient of distortion larger than a threshold value as a distorted region;

a fourth identifying unit for identifying a region of the wide-angle picture which has a coefficient of distortion equal to or smaller than the threshold value as an undistorted region.

In the terminal of the present disclosure, the terminal further includes:

a mapping unit for mapping the image obtained after the distortion rectifications by the correction unit to the wide-angle picture at the corresponding location.

In the terminal of the present disclosure, the acquiring unit in more detail is used for:

identifying a part of the targeted region located at the distorted region of the wide-angle picture as the targeted distorted region when the targeted region selected by the user includes a part of the non-distorted region.

In the terminal of the present disclosure, the first space transformation is linear space transformation or non-linear space transformation.

In the terminal of the present disclosure, the interpolation processing includes interpolation processing includes linear interpolation, dual linear interpolation, quadratic interpolation or nonlinear interpolation.

The embodiment of the present disclosure discloses the use of a camera lens of a terminal to take a wide-angle picture; distorted and undistorted regions of the wide-angle picture are identified; a targeted distorted region selected by a user is obtained; the targeted distorted region is divided in M-numbered grid areas each having a first predetermined size, wherein the M is an integer equal to or larger than 1; the M-numbered grid areas each having the first predetermined size are respectively subjected to distortion rectifications. The embodiment of the present disclosure, when adopted, can rectify the distortion of any distorted region selected by the user, and, thus, the distorted degree of the distorted region can be lessen.

DESCRIPTION OF THE EMBODIMENTS

In combination with the drawings of the embodiments of the present disclosure, the following is related to a detailed and complete description of the technology of the embodiments of the present disclosure. It is obvious that the disclosed embodiments are only a part of the embodiments available to the present disclosure, rather than the all embodiments thereof. Based on the disclosed embodiments of the present disclosure, other embodiments obtained by persons of ordinary skill in the art without endeavor of creativity belong to the protected scope of the present embodiments of the present disclosure.

In fact, in the embodiments of the present disclosure, the terminal can include but not limited to laptop computers, mobile phones, tablet computers, intelligent wearable devices, etc. The system of the terminal means operating system of the equipment, which can include but not limited to Android system, Symbian system, Window system, IOS (mobile operating system developed by Apple Inc.), XP system, Window 8 system, etc. It needs to explain that Android terminal means terminal having the Android system; Symbian terminal means terminal having the Symbian system, etc. The above mentioned terminals are only exemplified, not listed in details, which are included in the disclosure but not exclusive.

In the embodiments, the camera lens disclosed by the embodiments of the present disclosure is a wide-angle camera lens, whose angle of view is larger than the angle of view of a general camera lens available presently.

Referring to FIGS. 1 to 5, a distortion rectification method and a terminal in accordance with a first embodiment of the present disclosure are disclosed.

Figure 1:
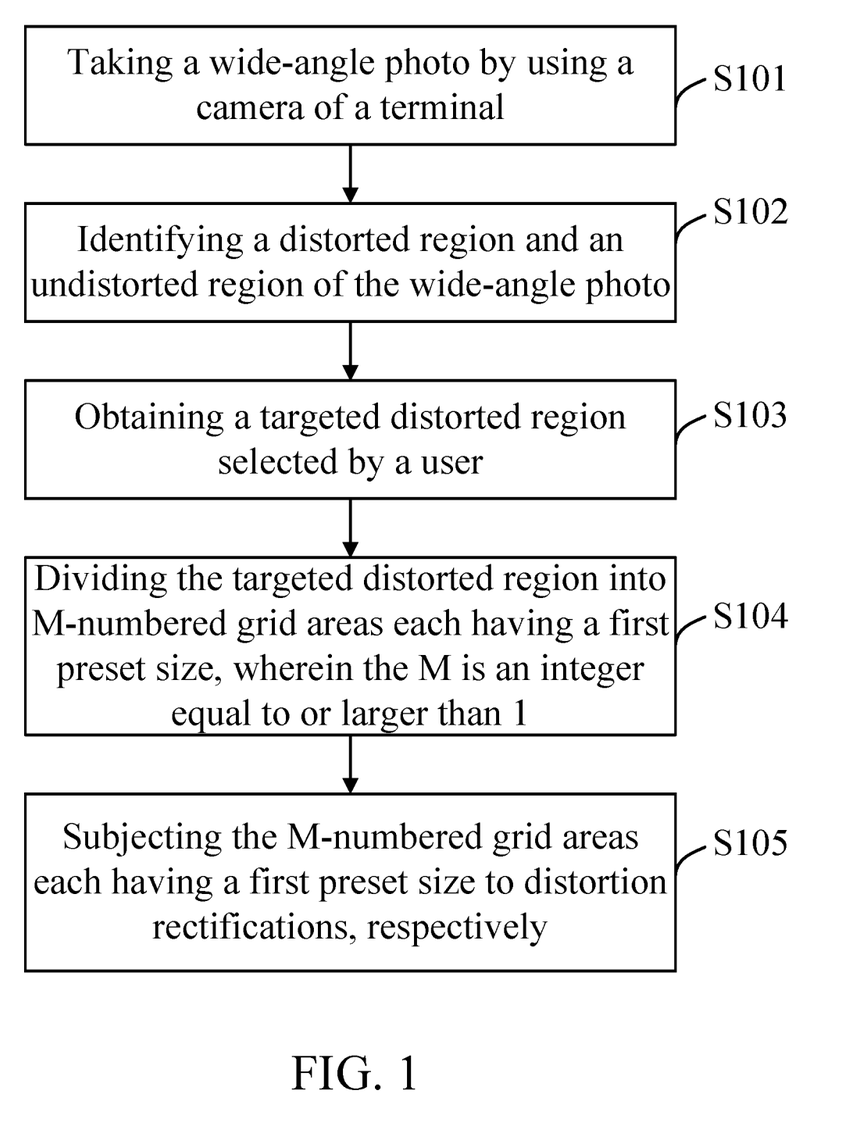
FIG. 1 is a flow chart of a method for distortion rectification according to a first embodiment of the present disclosure.

Please refer to FIG. 1. FIG. 1 shows a flow chart of a distortion rectification method provided by a first embodiment of the present disclosure, which includes the following blocks.

In block S101, a wide-angle photo is taken by using a camera lens of a terminal.

The terminal can use the camera lens of the terminal to shoot a wide-angle picture.

As a possible embodiment, the terminal can determine an angular range to be shot before the terminal uses the camera lens thereof to take a wide-angle photo. When the user activates the camera lens of the terminal, the user can adjust the angular range of shooting according the scene/object that the user wants to take in the photo. The angular range to be shot is ascertained by the user according to the size of the region that the scene/object occupies. The terminal can first obtain the touch instruction from the user regarding to the angular range to be shot that is determined by the user. If the range of the scene/object in the background is relatively small, the angular range to be shot can be adjusted to the viewing range of the general camera lens. In this condition, the picture taken thereby has a small distortion, which can be deemed as no distortion. If the scene/object in the background is relatively large, exceeding the viewing range of the general camera lens, the photo obtained by the angular range to be shot possibly needs to have a distortion rectification.

As a feasible embodiment, the camera lens of the terminal can be the front camera lens or the rear camera lens. Or the camera lens of the terminal can be a camera lens which is controlled by the terminal via wireless connection or wired connection.

In block S102, a distorted region and an undistorted region of the wide-angle picture are identified.

The terminal can determine the distorted region and the undistorted region of the wide-angle picture. The terminal can set up a threshold value beforehand, and assign the region consisting of pixel points which exceeds the threshold value as the distorted region, and the region equal to or smaller than the threshold value as the undistorted region. Furthermore, the magnitude of the threshold value can be set by the user or defaulted by the system. It is necessary to explain that in the general condition, due to its own characteristics of the wide-angle camera lens, the distortion of the wide-angle camera lens is always existed, and the wide-angle camera lens has the following feature of symmetry: the distortion coefficient is symmetrically distributed from a center of the wide-angle camera lens toward two lateral sides thereof. The distortion coefficient is well known in the art and will not be introduced in details here. The distortion coefficient indicates the degree of the distortion of the photo taken by the wide-angle camera lens. When the distortion coefficient of the wide-angle camera lens becomes larger, its degree of distortion becomes bigger. When the distortion coefficient of the wide-angle camera lens is within a limit, in other words, when the distortion coefficient is smaller than a preset threshold value, it can be deemed that the region whose distortion coefficient is smaller than a preset threshold value is an undistorted region; the corresponding photo shooting angle range of the undistorted region can be defined the angle range of the undistorted phot shooting.

In block S103, the targeted distorted region selected by the user is obtained.

The terminal can obtain the targeted distorted region selected by the user. In general, the region selected by the user can possibly be the undistorted region. Under this situation, the terminal is allowed not to correct the selected region. When the region selected by the user includes the distorted region and the undistorted region, the part of the region selected by the user which is at the distorted region of the wide-angle photo is identified as the targeted distorted region.

In block S104, the targeted distorted region is divided into M-numbered grid areas each having a first predetermined size, wherein the M is an integer equal to or larger than 1.

The terminal can divide the targeted distorted region into the M-numbered grid areas each having the first predetermined size, wherein the first predetermined size includes, but not limited to 3×3, 5×5, 7×7, 9×9, 11×11, etc.

In block S105, the M-numbered grid areas each having the first predetermined size are subjected to distortion rectifications, respectively.

The terminal can process the M-numbered grid areas each having the first preset size with rectifications, respectively.

The embodiment of the present disclosure uses the camera lens of the terminal to take a wide-angle picture, identifies the distorted region and undistorted region of the wide-angle picture, obtains the targeted distorted region selected by the user, divides the targeted distorted region into M-numbered grid areas each having a first predetermined size, wherein the M is an integer equal to or larger than 1, and rectifies the M-numbered distorted grid areas each having the first predetermined size, respectively. When the embodiment of the present disclosure is adopted, any distorted region selected by the user can be subjected to the distortion correction; thus, the degree of the distortion of the distorted region can be lessened.

Figure 2:
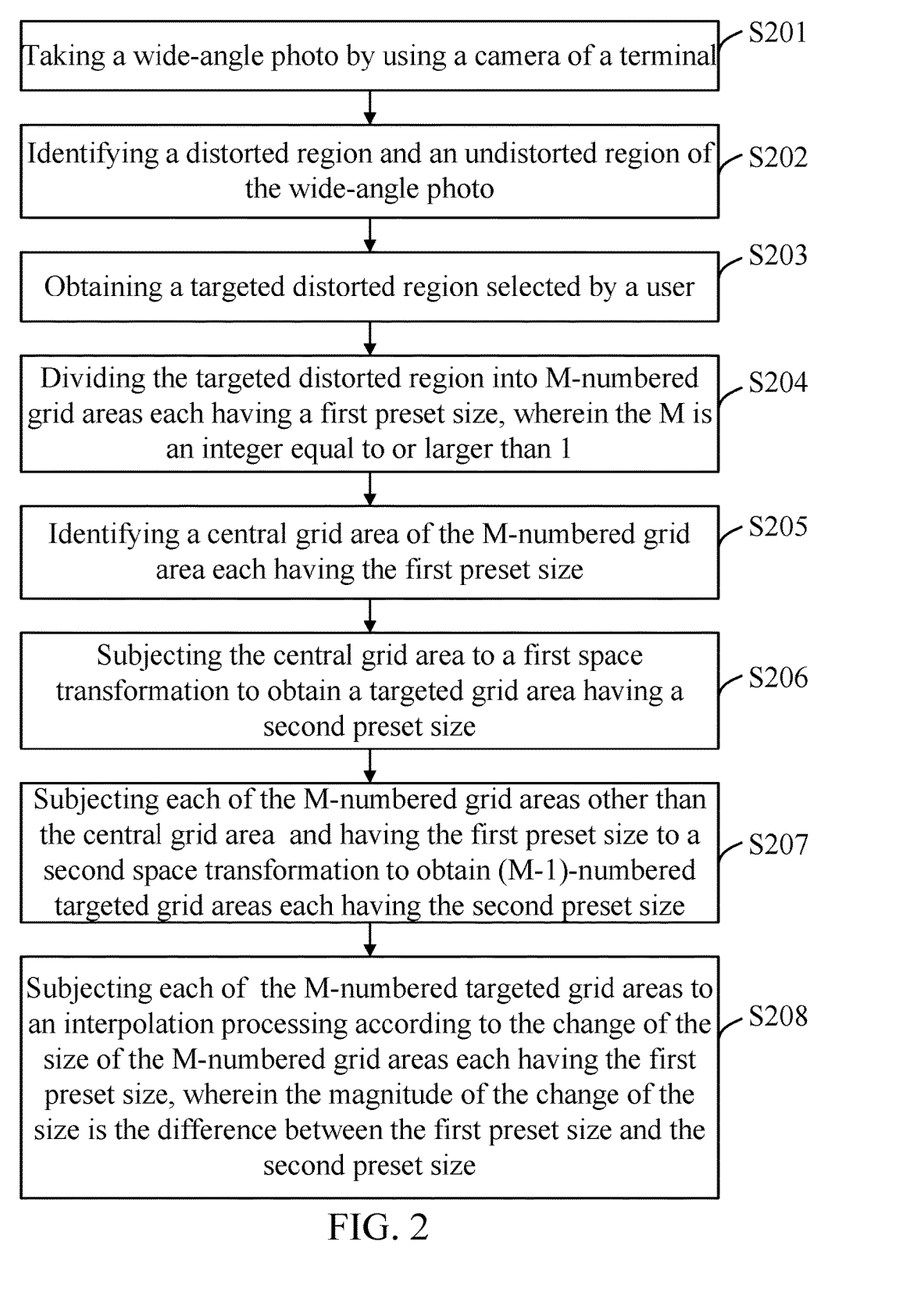
FIG. 2 is a flow chart of a method for distortion rectification according to a second embodiment of the present disclosure.

Referring to FIG. 2, FIG. 2 is a flow chart of a method for distortion rectification according to a second embodiment of the present disclosure. The distortion correction method disclosed by this embodiment includes the following blocks.

In block S201, a camera lens of a terminal is used to take a wide-angle photo.

The terminal can use a camera lens thereof to take the wide-angle photo.

As a possible embodiment, the terminal can make sure the angular range that the camera lens of the terminal is intended to shoot, before the camera lens of the terminal is used to take the photo. When the user activates the camera lens of the terminal, the user can decide the scene/object to be shot to adjust the angular range of the shooting. A predetermined angular range of shooting is ascertained by the user according to the size of the scene/object in the background. The terminal can obtain the touch instruction related to the angular range of shooting decided by the user and ascertain the predetermined angular range of shooting of the camera lens of the terminal according to the instruction. For example, if the range of the scene/object in the background is relatively small, the degree of distortion of the photo taken thereby becomes very small, which can be deemed as distortion free. If the scene/object in the background is relatively large which exceeds the shooting range of the common camera lens, the photo taken by the predetermined angular range of shooting may need subjecting to distortion correction.

As a possible embodiment, the camera lens of the terminal can be the front camera lens or the rear camera lens. Alternatively, the camera lens of the terminal can be a camera lens which is controlled by the terminal via wireless manner or wired manner.

In block S202, a distorted region and an undistorted region of the wide-angle photo are identified.

The terminal can identify the distorted region and the undistorted region of the wide-angle photo. The terminal can set a threshold value beforehand, and designate the region consisting of the pixel dots which has a value larger than the threshold vale as the distorted region and which has a value equal to or smaller than the threshold value as the undistorted region. Furthermore, the magnitude of the threshold value can be set by the user or defaulted by the system. It is necessary to explain that in the general condition, due to its own characteristics of the wide-angle camera lens, the distortion of the wide-angle camera lens is always existed, and the wide-angle camera lens has the following feature of symmetry: the distortion coefficient is symmetrically distributed from a center of the wide-angle camera lens toward two lateral sides thereof. The distortion coefficient is well known in the art and will not be introduced in details here. The distortion coefficient indicates the degree of the distortion of the photo taken by the wide-angle camera lens. When the distortion coefficient of the wide-angle camera lens becomes larger, its degree of distortion becomes bigger. When the distortion coefficient of the wide-angle camera lens is within a limit, in other words, when the distortion coefficient is smaller than a preset threshold value, it can be deemed that the region whose distortion coefficient is smaller than a preset threshold value is an undistorted region; the corresponding photo shooting angle range of the undistorted region can be defined the angle range of the undistorted phot shooting.

In block S203, the targeted distorted portion selected by the user is obtained.

The targeted distorted region selected by the user is obtained by the terminal. In general, the region selected by the user can possibly be the undistorted region. Under this condition, the terminal is allowed not to correct the region. When the region selected by the user includes both the distorted region and the undistorted region, the part of the region selected by the user which is at the distorted region of the wide-angle photo is identified as the targeted distorted region.

In block S204, the targeted distorted region is divided into M-numbered grid areas each having a first predetermined size, wherein the M is an integer equal to or larger than 1.

The terminal can divide the targeted distorted region into the M-numbered grid areas each having the first predetermined size, wherein the first predetermined size can include, but not limited to 3×3, 5×5, 7×7, 9×9, 11×11, etc.

In block S205, a central grid area of the M-numbered grid areas each having the first predetermined size is identified.

The central grid area is ascertained in accordance with the positional relationship among the M-numbered grid areas each having the first predetermined size.

In block S206, the central grid area is brought to undergo a first space transformation thereby to obtain a targeted grid area having a second predetermined size.

The terminal can proceed the central grid area with the first space transformation. The first space transformation can be linear space transformation or nonlinear space transformation, which subjects the central grid to a processing of elongation.

In block S207, except the central grid area, the other grid areas of the M-numbered grid areas are brought to undergo a second space transformation, thereby to obtain (M-1)-numbered targeted grid areas each having the second predetermined size.

The terminal can proceed the M-numbered grid areas each having the first predetermined size other than the central grid area with the second space transformation. The first predetermined size includes, but not limited to 3×3, 5×5, 7×7, 9×9, 11×11, etc.

The first space transformation may use a first transformation coefficient to proceed with the space transformation. The second space transformation may use a second transformation coefficient to proceed with the space transformation. The first coefficient can be different from the second coefficient. The first space transformation, based on the first transformation coefficient, of the central grid area having the first predetermined size can obtain the grid area having the second predetermined size. For example, the central grid can be pulled to be a planar area based on the apex of the central grid area. Alternatively, the central grid area can be pulled to be a curved area base on the apex of the central area. In order to make each of the grid areas of the M-numbered grid areas each having the first predetermined size other than the central grid area to be coincident with the second predetermined size, the second coefficient of the second space transformation can be ascertained in accordance with the dimensional ratio between the first predetermined size and the second predetermined size. Based on the second transformation coefficient, the grid areas of the M-numbered grid areas other than the central grid area are subjected to the second space transformation, thereby to obtain the M-1 number targeted grid areas. So far, the M-number targeted grid areas are obtained after the two space transformations.

In block S208, the M-numbered targeted grid areas are subject to an interpolation processing according to the change of the size of the M-numbered grid areas each having the first predetermined size, wherein the magnitude of the change of the size is the difference between the first predetermined size and the second predetermined size;

In order to make the image in the M-number grid areas looked more natural, the M-numbered targeted grid areas can be subjected to the interpolation processing. The coefficient of the interpolation can be ascertained in accordance with the difference between the first predetermined size and the second predetermined size. When the difference between the first predetermined size and the second predetermined size is small, the coefficient of the interpolation is small. When the difference between the first predetermined size and the second predetermined size is large, the coefficient of the interpolation is large. By using the coefficient of interpolation to proceed the M-numbered grid areas with processing of interpolation, the M-numbered grid areas can be subjected to the processing of interpolation by the change of magnitudes of the sizes of the M-number grid areas each having the first predetermined size. The change of the magnitudes of the sizes is the difference between the first predetermined size and the second predetermined size. Taking the targeted grid area i as example, the targeted grid area i is one of the M-numbered grid areas. After the space transformation, the size of the targeted grid area i is changed from the first predetermined size to the second predetermined size. The coefficient of interpolation can be ascertained according to the difference between the first predetermined size and the second predetermined size. The targeted grid area i can be processed by interpolation by using the coefficient of interpolation.

The terminal can proceed the M-numbered targeted grid areas with the processing of interpolation, respectively, according to the magnitude of change of the size of the M-numbered grid areas each having the first predetermined size. The magnitude of change of the size is the difference between the first predetermined size and the second predetermined size. The purpose of interpolation is to smoothen the grid areas, thereby to make the periphery of the grid area look natural. The processing of interpolation may include linear interpolation, dual linear interpolation, quadratic interpolation or nonlinear interpolation.

The embodiment of the present disclosure uses the camera lens of the terminal to take a wide-angle picture; distorted and undistorted regions of the wide-angle picture are identified; a targeted distorted region selected by a user is obtained; the targeted distorted region is divided in M-numbered grid areas each having a first predetermined size, wherein the M is an integer equal to or larger than 1; the M-numbered grid areas each having the first predetermined size are respectively subjected to distortion rectifications. The embodiment of the present disclosure, when adopted, can rectify the distortion of any distorted region selected by the user, and, thus, the distorted degree of the distorted region can be lessen.

Figure 3:
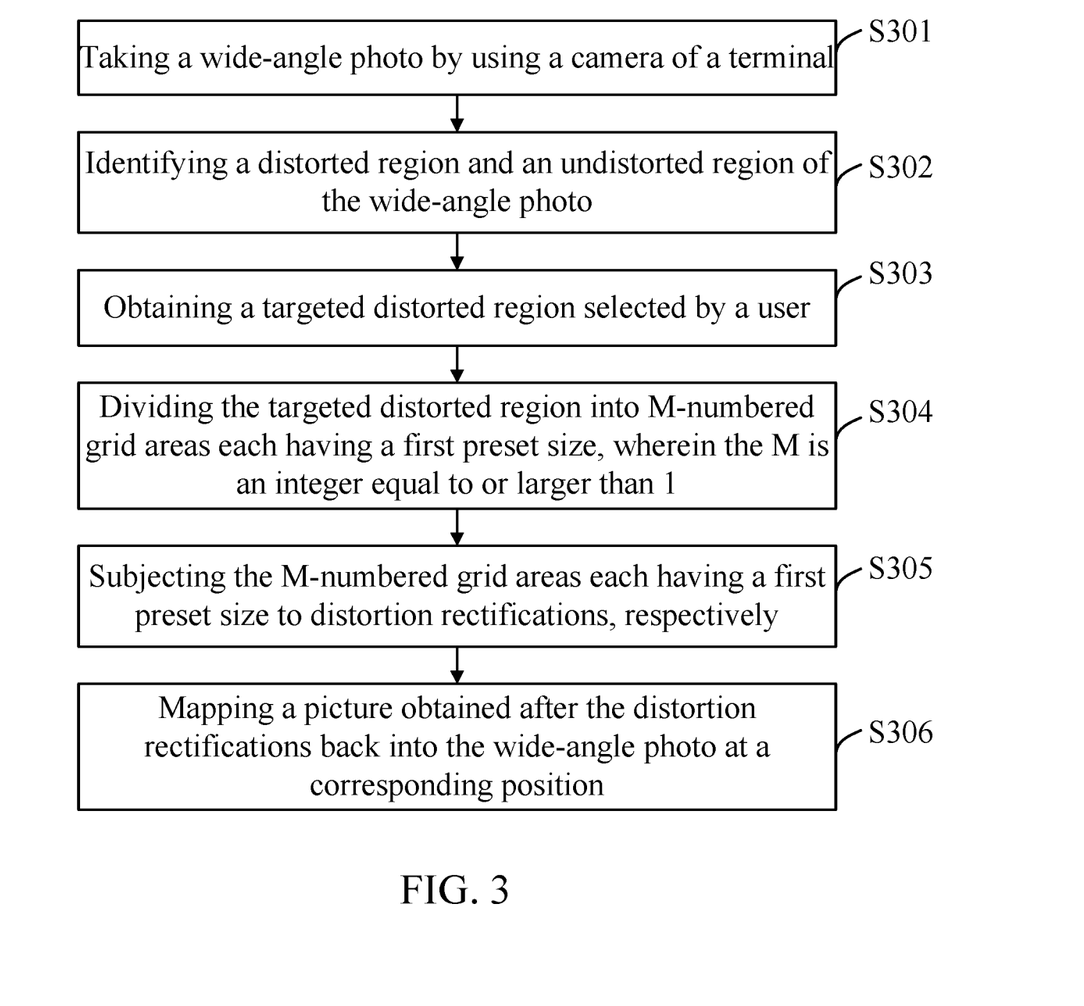
FIG. 3 is a flow chart of a method for distortion rectification according to a third embodiment of the present disclosure.

Referring to FIG. 3, FIG. 3 is a flow chart of a method for distortion rectification according to a third embodiment of the present disclosure. The distortion correction method disclosed by this embodiment includes the following blocks.

In block S301, a camera lens of a terminal is used to take a wide-angle photo.

The terminal can use a camera lens thereof to take the wide-angle photo.

As a possible embodiment, the terminal can make sure the angular range that the camera lens of the terminal is intended to shoot, before the camera lens of the terminal is used to take the photo. When the user activates the camera lens of the terminal, the user can decide the scene/object to be shot to adjust the angular range of the shooting. A predetermined angular range of shooting is ascertained by the user according to the size of the scene/object in the background. The terminal can obtain the touch instruction related to the angular range of shooting decided by the user and ascertain the predetermined angular range of shooting of the camera lens of the terminal according to the instruction. For example, if the range of the scene/object in the background is relatively small, the degree of distortion of the photo taken thereby becomes very small, which can be deemed as distortion free. If the scene/object in the background is relatively large which exceeds the shooting range of the common camera lens, the photo taken by the predetermined angular range of shooting may need subjecting to distortion correction.

As a possible embodiment, the camera lens of the terminal can be the front camera lens or the rear camera lens. Alternatively, the camera lens of the terminal can be a camera lens which is controlled by the terminal via wireless manner or wired manner.

In block S302, a distorted region and an undistorted region of the wide-angle photo are identified.

The terminal can identify the distorted region and the undistorted region of the wide-angle photo. The terminal can set a threshold value beforehand, and designate the region consisting of the pixel dots which has a value larger than the threshold vale as the distorted region and which has a value equal to or smaller than the threshold value as the undistorted region. Furthermore, the magnitude of the threshold value can be set by the user or defaulted by the system. It is necessary to explain that in the general condition, due to its own characteristics of the wide-angle camera lens, the distortion of the wide-angle camera lens is always existed, and the wide-angle camera lens has the following feature of symmetry: the distortion coefficient is symmetrically distributed from a center of the wide-angle camera lens toward two lateral sides thereof. The distortion coefficient is well known in the art and will not be introduced in details here. The distortion coefficient indicates the degree of the distortion of the photo taken by the wide-angle camera lens. When the distortion coefficient of the wide-angle camera lens becomes larger, its degree of distortion becomes bigger. When the distortion coefficient of the wide-angle camera lens is within a limit, in other words, when the distortion coefficient is smaller than a preset threshold value, it can be deemed that the region whose distortion coefficient is smaller than a preset threshold value is an undistorted region; the corresponding photo shooting angle range of the undistorted region can be defined the angle range of the undistorted phot shooting.

In block S303, the targeted distorted portion selected by the user is obtained.

The targeted distorted region selected by the user is obtained by the terminal. In general, the region selected by the user can possibly be the undistorted region. Under this condition, the terminal is allowed not to correct the region. When the region selected by the user includes both the distorted region and the undistorted region, the part of the region selected by the user which is at the distorted region of the wide-angle photo is identified as the targeted distorted region.

In block S304, the targeted distorted region is divided into M-numbered grid areas each having a first predetermined size, wherein the M is an integer equal to or larger than 1.

The terminal can divide the targeted distorted region is divided into the M-numbered grid areas each having the first predetermined size, wherein the first predetermined size can include, but not limited to 3×3, 5×5, 7×7, 9×9, 11×11, etc.

In block S305, the M-numbered grid areas each having the first predetermined size are subjected to distortion corrections, respectively.

The terminal can process the M-numbered grid area each having the first predetermined size with the distortion rectification.

In block S306, the image which has been undergone the distortion rectifications is mapped into the wide-angle photo at the corresponding position.

The terminal can adjust the size of the region after the distortion rectification, and subject the periphery of the region to a smoothening process to make the image after the distortion rectifications be better mapped into the wide-angle photo at the corresponding position.

The embodiment of the present disclosure uses a camera lens of a terminal to take a wide-angle photo; distorted and undistorted regions of the wide-angle picture are identified; a targeted distorted region selected by a user is obtained; the targeted distorted region is divided in M-numbered grid areas each having a first predetermined size, wherein the M is an integer equal or larger than 1; the M-numbered numbered grid areas each having the first predetermined size are subjected to distortion rectifications, respectively. The embodiment of the present disclosure, when adopted, can rectify the distortion of any distorted region selected by the user, and, thus, the distorted degree of the distorted region can be lessen.

Figure 4A:
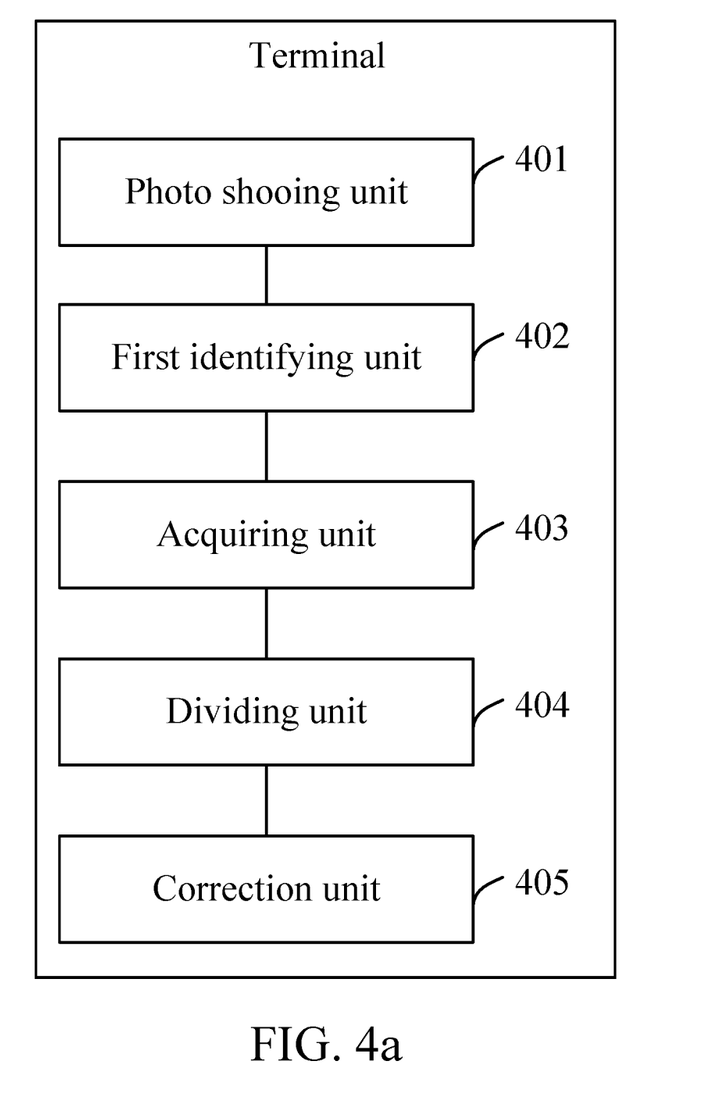
FIG. 4a is structural diagram of a terminal according to a first embodiment of the present disclosure.

Referring to FIG. 4a, FIG. 4a FIG. 4a is structural diagram of a terminal according to a first embodiment of the present disclosure. The terminal disclosed by this embodiment includes:

A photo shooting unit 401 is used for utilizing a camera lens of the terminal to take a wide-angle picture.

The photo shooting unit 401 can use the camera lens of the terminal to take a wide-angle photo.

As a possible embodiment, the photo shooting unit 401 can determine an angular range to be shot before it uses the camera lens of terminal to take a wide-angle photo. When the user activates the camera lens of the terminal, the user can adjust the angular range of shooting according the scene/object that the user wants to take in the photo. The angular range to be shot is ascertained by the user according to the size of the region that the scene/object occupies. The terminal can first obtain the touch instruction from the user regarding to the angular range to be shot that is determined by the user. If the range of the scene/object in the background is relatively small, the angular range to be shot can be adjusted to the viewing range of the general camera lens. In this condition, the picture taken thereby has a small distortion, which can be deemed as no distortion. If the scene/object in the background is relatively large, exceeding the viewing range of the general camera lens, the photo obtained by the angular range to be shot possibly needs having a distortion rectification.

As a possible embodiment, the camera lens of the terminal can be the front camera lens or the rear camera lens. Alternatively, the camera lens of the terminal can be a camera lens which is controlled by the terminal via wireless manner or wired manner.

A first identifying unit 402 is used for identifying a distorted region and an undistorted region of the wide-angle picture taken by the photo shooting unit.

The first identifying unit can identify the distorted region and the undistorted region of the wide-angle photo. The terminal can set a threshold value beforehand, and designate the region consisting of the pixel dots which has a value larger than the threshold vale as the distorted region and which has a value equal to or smaller than the threshold value as the undistorted region. Furthermore, the magnitude of the threshold value can be set by the user or defaulted by the system. It is necessary to explain that in the general condition, due to its own characteristics of the wide-angle camera lens, the distortion of the wide-angle camera lens is always existed, and the wide-angle camera lens has the following feature of symmetry: the distortion coefficient is symmetrically distributed from a center of the wide-angle camera lens toward two lateral sides thereof. The distortion coefficient is well known in the art and will not be introduced in details here. The distortion coefficient indicates the degree of the distortion of the photo taken by the wide-angle camera lens. When the distortion coefficient of the wide-angle camera lens becomes larger, its degree of distortion becomes bigger. When the distortion coefficient of the wide-angle camera lens is within a limit, in other words, when the distortion coefficient is smaller than a preset threshold value, it can be deemed that the region whose distortion coefficient is smaller than a preset threshold value is an undistorted region; the corresponding photo shooting angle range of the undistorted region can be defined the angle range of the undistorted phot shooting.

An acquiring unit 403 is used for obtaining a targeted distorted region selected by a user.

The acquiring unit 403 can obtain the targeted distorted region selected by the user. In general, the region selected by the user can possibly be the undistorted region. Under this situation, the terminal is allowed not to correct the selected region. When the region selected by the user includes the distorted region and the undistorted region, a part of the region selected by the user which is at the distorted region of the wide-angle photo is ascertained as the targeted distorted region.

A dividing unit 404 is used for dividing the targeted distorted region obtained by the acquiring unit into M-numbered grid areas each having a first predetermined size, wherein the M is an integer equal to or larger than 1.

The dividing unit 404 can divide the targeted distorted region into the M-numbered grid areas each having the first predetermined size, wherein the first predetermined size includes, but not limited to 3×3, 5×5, 7×7, 9×9, 11×11, etc.

A correction unit 405 is used for rectifying the distortion of each of the M-numbered grid areas divided by the dividing unit and having the first predetermined size.

The correction unit 405 can process the M-numbered grid areas each having the first predetermined size with the distortion rectification.

Figure 4B:
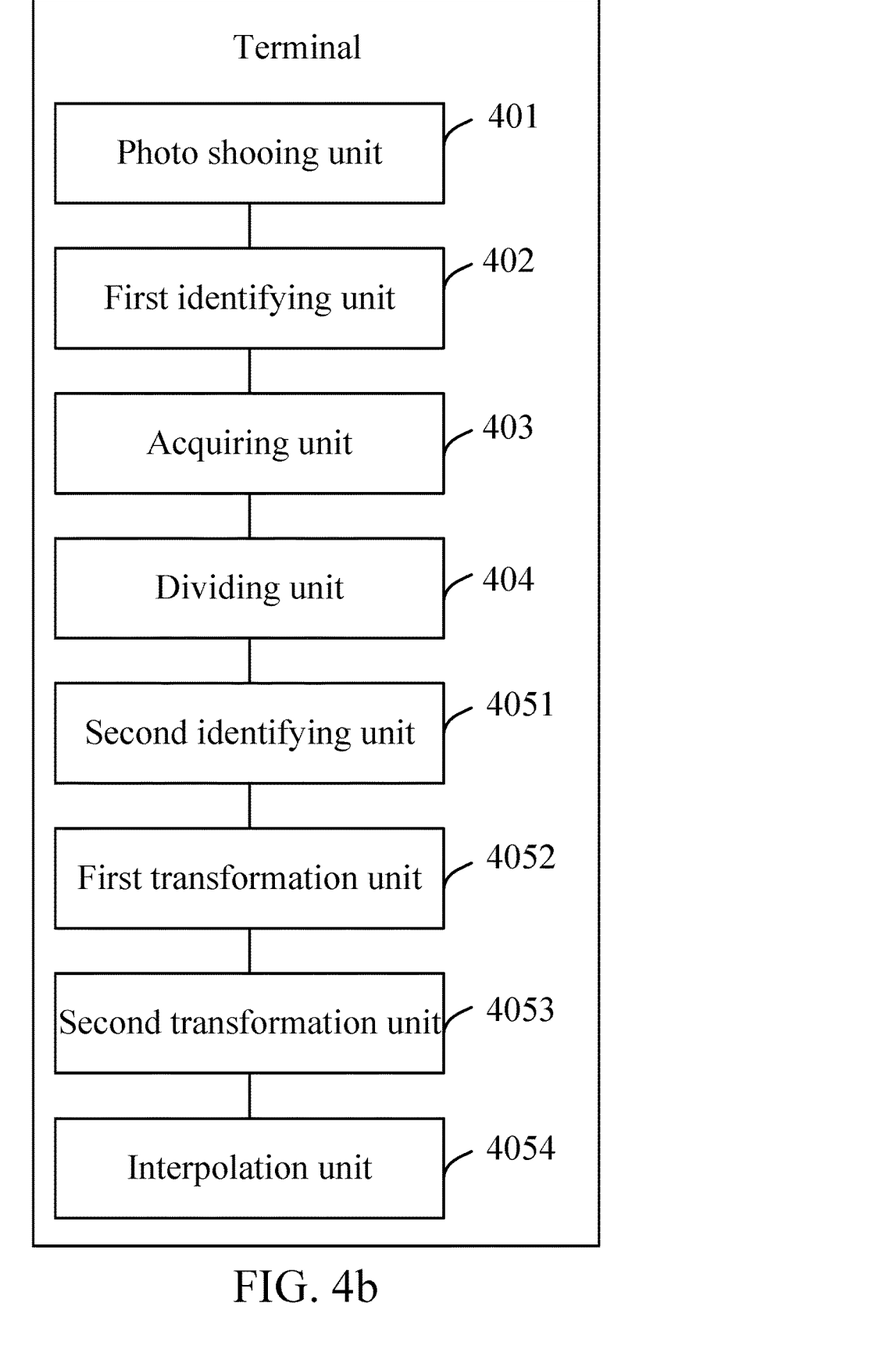
FIG. 4b is another structural diagram of the terminal according to the first embodiment of the present disclosure.

As a possible embodiment, as shown in FIG. 4b, the correction unit 405 of FIG. 4a can include a second identifying unit 4051 and a first transformation unit 4052 whose details are given as follows.

The second identifying unit 4051 is used for identifying a central grid area of the M-numbered grid areas each having the first predetermined size and divided by the diving unit.

The second identifying unit can make sure the central grid area according to the positional relationship among the M-numbered grid area each having the first predetermined size.

A first transformation unit 4052 is used for subjecting the central grid area identified by the second identifying unit to a space transformation to obtain a targeted grid area having a second predetermined size.

The first transformation unit 4052 can process the central grid area with a first space transformation. The first space transformation can be linear space transformation or nonlinear space transformation which subjects the image in the central grid area to a processing of elongation.

A second transformation unit 4053 is provided for subjecting each of the M-numbered grid areas other than the central grid area and having the first predetermined size to a second space transformation to obtain (M-1)-numbered targeted grid areas each having the second predetermined size.

The second transformation unit 4053 can subject each of the M-numbered grid areas other than the central grid area and having the first predetermined size to a second space transformation, wherein the first predetermined size includes, but not limited to 3×3, 5×5, 7×7, 9×9, 11×11, etc.

An interpolation unit 4054 is used for subjecting each of the M-numbered targeted grid areas to an interpolation processing according to the change of the size of the M-numbered grid areas each having the first predetermined size, wherein the magnitude of the change of the size is the difference between the first predetermined size and the second predetermined size.

The interpolation unit 4054 can proceed the M-numbered targeted grid areas with the processing of interpolation, respectively, according to the magnitude of change of the size of the M-numbered grid areas each having the first predetermined size. The magnitude of change of the size is the difference between the first predetermined size and the second predetermined size. The purpose of interpolation is to smoothen the grid areas, thereby to make the periphery of the grid area look natural. The processing of interpolation may include linear interpolation, dual linear interpolation, quadratic interpolation or nonlinear interpolation.

Figure 4C:
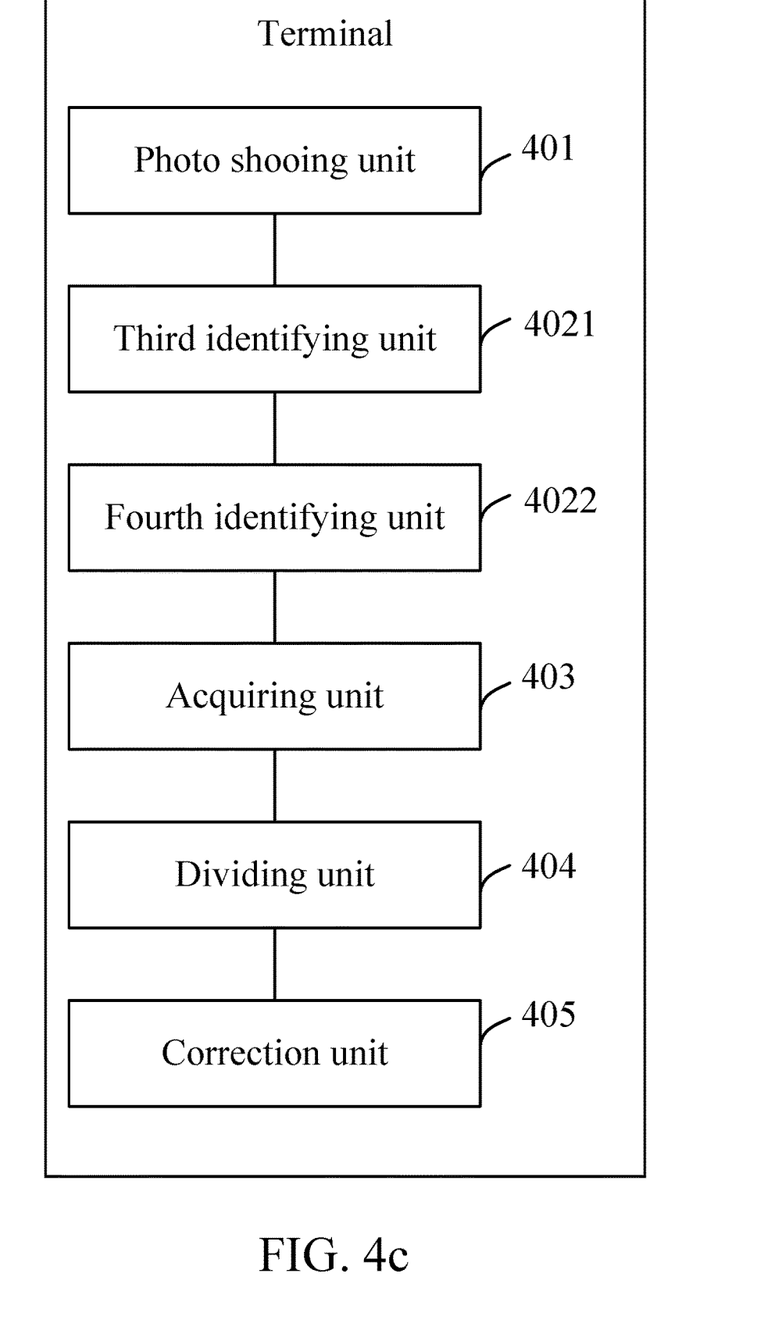
FIG. 4c is still another structural diagram of the terminal according to the first embodiment of the present disclosure.

As a possible embodiment, as shown in FIG. 4c, the first identifying unit 402 of FIG. 4a can include a third identifying unit 4021 and a fourth identifying unit 4022 whose details are given as follows.

Figure 4D:
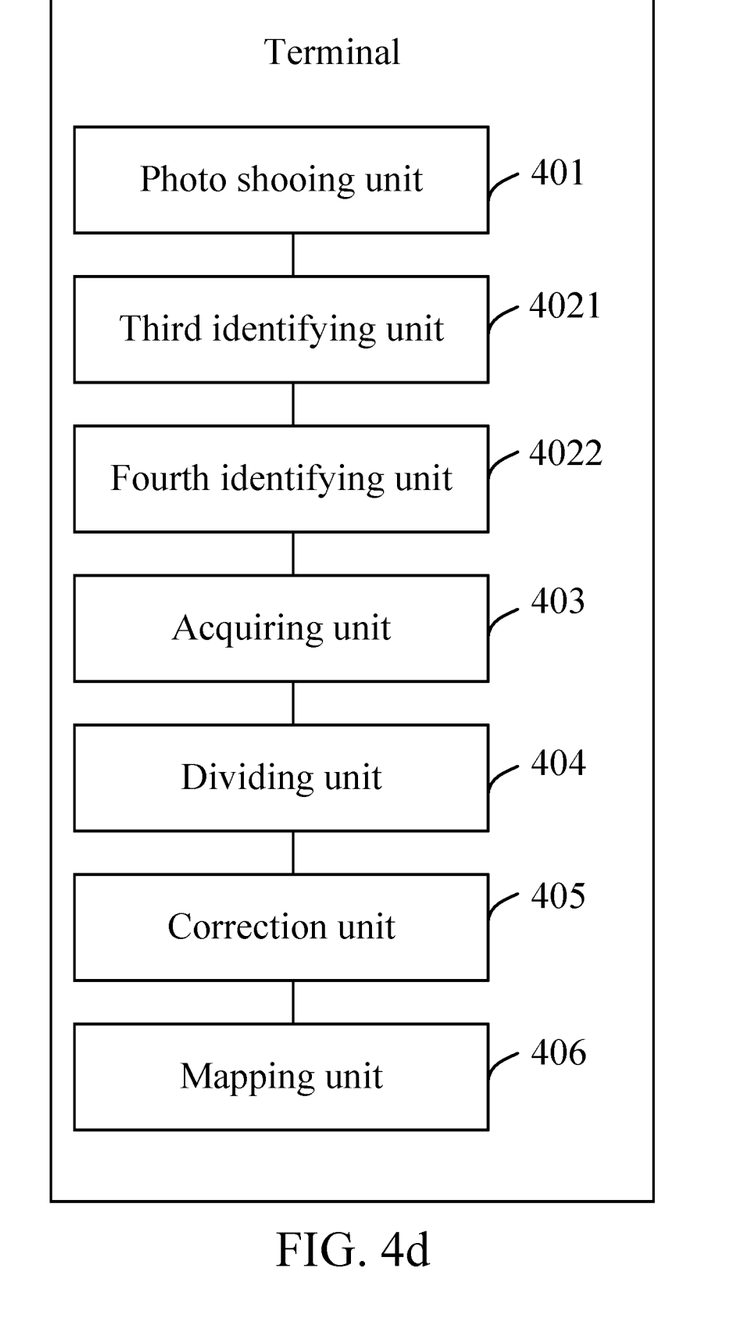
FIG. 4d is a further structural diagram of the terminal according to the first embodiment of the present disclosure.

The third identifying unit 4021 is used for identifying a region of the wide-angle picture which has a coefficient of distortion larger than a threshold value as a distorted region;

The fourth identifying unit 4022 is used for identifying a region of the wide-angle picture which has a coefficient of distortion equal to or smaller than the threshold value as an undistorted region;

As a possible embodiment, as shown in FIG. 4d, the terminal disclosed by FIG. 4a can further include:

A mapping unit 406 is used for mapping the rectified distorted image back to the wide-angle picture at the corresponding location.

The mapping unit 406 can adjust the size of the region after the distortion rectification by the correction unit 405, and subject the periphery of the region to a smoothening process to make the image after the distortion rectification be better mapped into the wide-angle photo at the corresponding position.

The terminal disclosed by the embodiment of the present disclosure uses the camera lens of the terminal to take a wide-angle picture, identifies the distorted region and undistorted region of the wide-angle picture, obtains the targeted distorted region selected by the user, divides the targeted distorted region into M-numbered grid areas each having a first predetermined size, wherein the M is an integer equal to or larger than 1, and rectifies the M-numbered distorted grid areas each having the first predetermined size, respectively. When the embodiment of the present disclosure is adopted, any distorted region selected by the user can be subjected to the distortion correction; thus, the degree of the distortion of the distorted region can be lessened.

Figure 5:
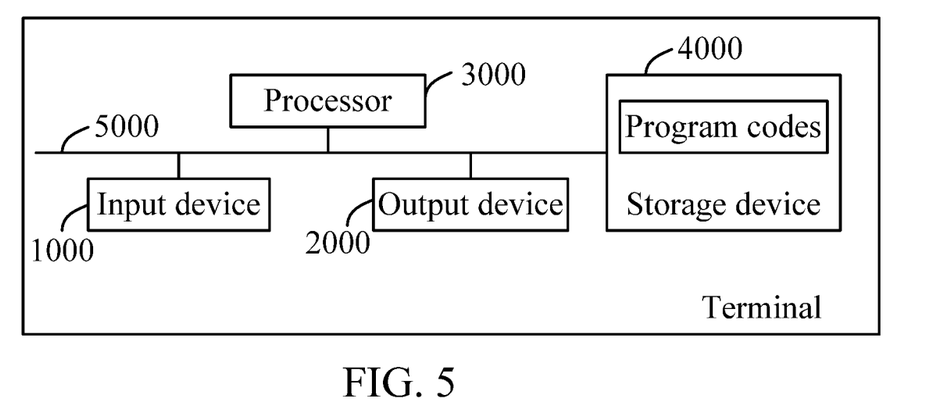
FIG. 5 is a structural diagram of a terminal according to a second embodiment of the present disclosure.

Referring to FIG. 5, FIG. 5 is a structural diagram of a terminal according to a second embodiment of the present disclosure. The terminal disclosed by this embodiment includes at least an input device 1000, at least an output device 2000, at least a processor 3000 such as a CPU, and a storage device 4000. The input device 1000, output device 2000, processor 3000 and storage device 4000 are connected together via a bus 5000.

The input device 1000 can be a touch panel, a general personal computer (PC), a liquid crystal display, a touch pad, touch control buttons, etc.

The storage device 4000 can be high speed RAM, non-volatile memory such as a disk storage device. The storage device 4000 can be used to store therein a set of program codes. The input device 1000, output device 2000 and the processor 3000 are used to fetch the program codes from the storage device 4000 for executing the following operations.

The processor 3000 is used for utilizing the camera lens of the terminal to take a wide-angle photo;

identifying the distorted region and undistorted region of the wide-angle photo;

obtaining the targeted distorted region selected by the user;

dividing the targeted distorted region into M-numbered grid areas each having a first predetermined size, wherein the M is an integer equal to or larger than 1;

subjecting each of the M-numbered grid areas each having the first predetermined size to a distortion rectification.

As an possible embodiment, the processor 3000 subjects each of the M-numbered grid areas each having the first predetermined size to a distortion rectification. The details therefor are:

identifying the central grid area of the M-numbered grid areas each having the first predetermined size;

subjecting the central grid area to a first space transformation to obtain a targeted grid area having a second predetermined size;

subjecting each of the M-numbered grid areas other than the central grid area and having the first predetermined size to a second space transformation to obtain (M-1)-numbered targeted grid areas each having the second predetermined size;

subjecting each of the M-numbered targeted grid areas to an interpolation processing according to the change of the size of the M-numbered grid areas each having the first predetermined size, wherein the magnitude of the change of the size is the difference between the first predetermined size and the second predetermined size.

As a possible embodiment, the processor 3000 identifies the distorted region and the undistorted region of the wide-angle photo. The details therefor are:

designating a region of the wide-angle picture whose distortion coefficient is larger than a threshold vale as the distorted region;

designating a region of the wide-angle picture whose distortion coefficient is equal to or smaller than the threshold vale as the undistorted region.

As a possible embodiment, the processor 3000 processes the M-number grid areas each having the first predetermined size with the following operation after they have been subjected to the distortion rectifications:

mapping the image obtained after the distortion rectifications back to the wide-angle picture at a corresponding location.

As a possible embodiment, the processor 3000 obtains the target distorted region selected by the user; the details therefor are:

when the target region selected by the user includes the undistorted region, the portion of the targeted region at the distorted region of the wide-angle picture is identified as the targeted distorted region.

The camera lens of the terminal of the embodiment of the present disclosure is used to take a wide-angle photo; the distorted region and the undistorted region of the wide-angle photo are identified. The targeted distorted region selected by the user is obtained. The targeted distorted region is divided into M-numbered grid areas each having a first predetermined size, wherein the M is an integer equal to or larger than 1. The M-numbered grid areas each having the first predetermined size are subjected to distortion rectifications, respectively. By adopting the embodiment of the present disclosure, any distorted region selected by the user can be subjected to the distortion correction, thereby to lessen the degree of distortion of the distorted region.

The embodiment of the present disclosure also provides a computer storage medium, wherein the computer storage medium stores therein a program. The execution of the program includes a part or a whole of any processing methods disclosed in the above mentioned method embodiments.

In the above embodiments, the description of each of the embodiments has its own focus, and portions that are not described in detail in one embodiment can refer to the relevant description of another embodiment.

It needs to explain that in the method embodiments as disclosed so far, for simplification of description, each method being disclosed in a serial of actions; however, those of ordinary skill in the art would understand that the present disclosure is not limited to the described sequence of actions since certain blocks may be performed in other sequences or may be simultaneously performed according to the present disclosure. Moreover, those of ordinary skill in the art would understand that the embodiments described in the specification are all preferred embodiments, and the actions and module involved are not necessarily essential to the present disclosure.

In the embodiments provided by the present disclosure, it should be understood that the device as disclosed can be carried out by other manners. For example, the device embodiments as disclosed above are merely illustrative. For example, the division of the above mentioned units are only divided by logic functions. In practice, they can have another division. For example, some units or components can be combined or assembled into another system. Alternatively, some features can be ignored or not executed. On the other hand, the coupling with each other or direct coupling or communicative connection as shown or discussed can be carried out by using connectors. The indirect coupling or communicative connection between the devices and units can be electrical or by other forms.

The above disclosed units which are described as individual elements can be physically separated or not. The part functioning as the unit display can be or be not a physical unit; in other words, the part can be located at a place or distributed over a plurality of units on a net. It can select a portion of or all of the units to practice the embodiments of the present disclosure according the actual necessity.

In addition, the functional units of the embodiments of the present disclosure can be integrated into a single processing unit, or they can physically separately existed, or two or more of them can be integrated into a single unit. The integrated unit can be practiced in the form of hardware, or in the form of software function unit.

The above mentioned integrated units if they are practiced in a software function unit and sold or used as a single product, they can stored in a computer readable storage medium. Based on such understanding, the technological solution proposed by the present disclosure essentially or a part thereof which can improve the technology presently used, the whole or the part of the technological solution can be embodied in the form of software product. The computer software is stored in a storage medium, which includes instructions enabling a computing device (for example, personal computer, server or network equipment, more specifically, a processor in a computer device) to execute the all blocks or partial blocks of the methods disclosed by the embodiments of the present disclosure. The computer readable medium may include: a U-disk, an external hard disk, a hard disk drive, an optical disk, a read-only memory (ROM), a random access memory (RAM), etc., which is a medium able to store therein program codes.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

What is claimed is:

1. A method for distortion rectification comprising:
   taking a wide-angle photo by a camera lens of a terminal;
   identifying a distorted region and an undistorted region of the wide-angle photo;
   obtaining a targeted distorted region selected by a user, wherein the targeted distorted region is a region selected by the user which is located at a region of the distorted region of the wide-angle photo;
   dividing the targeted distorted region into M-numbered grid areas each having a first predetermined size, wherein the M is an integer equal to or larger than 3;
   subjecting the M-numbered grid areas each having the first predetermined size to distortion rectifications, respectively;
   wherein subjecting the M-numbered grid areas each having the first predetermined size to distortion rectifications, respectively, includes:
   identifying a central grid area of the M-numbered grid areas each having the first predetermined size;
   subjecting the central grid area to a first space transformation to obtain a targeted grid area having a second predetermined size;
   subjecting each of the M-numbered grid areas other than the central grid area and having the first predetermined size to a second space transformation to obtain (M-1)-numbered targeted grid areas each having the second predetermined size;
   subjecting each of the M-numbered targeted grid areas to an interpolation processing according to a change of size of the M-numbered grid areas each having the first predetermined size, wherein a magnitude of the change of size is a difference between the first predetermined size and the second predetermined size.

2. The method as claimed in claim 1, wherein identifying the distorted region and undistorted region of the wide-angle photo comprises:
   identifying a region of the wide-angle photo which has a distortion coefficient larger than a preset threshold value as the distorted region;

identifying a region of the wide-angle photo which has a distortion coefficient equal to or smaller than the preset threshold value as the undistorted region.

3. The method as claimed in claim 1, wherein subjecting the M-numbered grid areas each having the first predetermined size to distortion rectifications, respectively, comprises:

mapping an image obtained after the distortion rectifications back to the wide-angle photo at a corresponding position.

4. The method as claimed in claim 1, wherein obtaining the targeted distorted region selected by the user comprises:

when the targeted distorted region selected by the user includes the undistorted region, a region of the targeted distorted region which is located at the distorted region is identified as the targeted distorted region.

5. A terminal comprising:

a photo shooting unit for taking a wide-angle photo by using a camera lens of the terminal;

a first identifying unit for identifying a distorted region and an undistorted region of the wide-angle photo taken by the photo shooting unit;

an acquiring unit for obtaining a targeted distorted region selected by a user, wherein the targeted distorted region is a region selected by the user which is located at a region of the distorted region of the wide-angle photo;

a dividing unit for dividing the targeted distorted region into M-numbered grid areas each having a first predetermined size, wherein the M is an integer larger than or equal to 3;

a correction unit for subjecting the M-numbered grid areas each having the predetermined first size to distortion rectifications, respectively;

wherein the correction unit comprises:

a second identifying unit for identifying a central grid area of the M-numbered grid areas each having the first predetermined size;

a first transformation unit for subjecting the central grid area identified by the second identifying unit to a first space transformation to obtain a targeted grid area having a second predetermined size;

a second transformation unit for subjecting each of the M-numbered grid areas other than the central grid area and having the first predetermined size to a second space transformation to obtain (M-1)-numbered targeted grid areas each having the second predetermined size;

an interpolation unit for subjecting each of the M-numbered targeted grid areas to an interpolation processing according to a change of size of the M-numbered grid areas each having the first predetermined size, wherein a magnitude of the change the size is a difference between the first predetermined size and the second predetermined size.

6. The terminal as claimed in claim 5, wherein the first identifying unit comprises:

a third identifying unit for identifying a region of the wide-angle photo which has a distortion coefficient larger than a preset threshold value as the distorted region; and a fourth identifying unit for identifying a region of the wide-angle photo which has a distortion coefficient equal to or smaller than a preset threshold value as the undistorted region.

7. The terminal as claimed in claim 5, wherein the terminal further comprises:

a mapping unit for mapping an image obtained after the distortion rectifications processed by the correction unit back to the wide-angle photo at a corresponding position.

8. The terminal as claimed in claim 5, wherein the acquiring unit is used for:

identifying a region of the targeted distorted region located at the distorted region of the wide-angle picture as the targeted distorted region when the targeted distorted region selected by the user includes the undistorted region.

* * * * *